United States Patent
Sun et al.

(10) Patent No.: US 12,162,115 B2
(45) Date of Patent: *Dec. 10, 2024

(54) CHAMBER COMPONENTS WITH POLISHED INTERNAL APERTURES

(71) Applicant: Applied Materials, Inc., Santa Clara, CA (US)

(72) Inventors: Jennifer Y. Sun, Mountain View, CA (US); Vahid Firouzdor, San Mateo, CA (US); David Koonce, Santa Clara, CA (US); Biraja Prasad Kanungo, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/215,633

(22) Filed: Jun. 28, 2023

(65) Prior Publication Data
US 2023/0339065 A1   Oct. 26, 2023

Related U.S. Application Data

(60) Division of application No. 17/834,207, filed on Jun. 7, 2022, now Pat. No. 11,724,353, which is a division of application No. 16/216,796, filed on Dec. 11, 2018, now Pat. No. 11,370,078, which is a continuation of application No. 15/619,024, filed on Jun. 9, 2017, now Pat. No. 10,189,141, which is a division of (Continued)

(51) Int. Cl.
| | | |
|---|---|---|
| B24B 5/40 | (2006.01) | |
| B23B 35/00 | (2006.01) | |
| B24B 31/00 | (2006.01) | |
| B24B 31/116 | (2006.01) | |
| B24B 33/02 | (2006.01) | |
| B24B 57/04 | (2006.01) | |

(52) U.S. Cl.
CPC ............ B24B 31/006 (2013.01); B23B 35/00 (2013.01); B24B 5/40 (2013.01); B24B 31/003 (2013.01); B24B 31/116 (2013.01); B24B 33/02 (2013.01); B24B 57/04 (2013.01); *B23B 2220/445* (2013.01); *B23B 2226/18* (2013.01)

(58) Field of Classification Search
CPC ....... B24B 5/40; B24B 31/003; B24B 31/006; B24B 31/116; B24B 33/02
USPC ..................... 451/36, 61, 104, 113
See application file for complete search history.

(56) References Cited

U.S. PATENT DOCUMENTS

| | | |
|---|---|---|
| 3,074,392 A | 1/1963 | Fisher |
| 3,521,412 A * | 7/1970 | McCarty ............... B24B 31/116 51/299 |

(Continued)

FOREIGN PATENT DOCUMENTS

| | | |
|---|---|---|
| CN | 10273862 A | 9/2011 |
| CN | 102173862 B | 2/2013 |

(Continued)

*Primary Examiner* — Eileen P Morgan
(74) *Attorney, Agent, or Firm* — LOWENSTEIN SANDLER LLP

(57) ABSTRACT

Disclosed herein is a plasma-resistant chamber component and a method for manufacturing the same. A plasma-resistant chamber component of a semiconductor processing chamber that generates a plasma environment includes a ceramic article having multiple polished apertures. A roughness of the multiple polished apertures is less than 32 μin.

20 Claims, 4 Drawing Sheets

Related U.S. Application Data application No. 14/318,518, filed on Jun. 27, 2014, now Pat. No. 9,687,953.

(56) References Cited

U.S. PATENT DOCUMENTS

| | | | | |
|---|---|---|---|---|
| 3,728,821 | A * | 4/1973 | Perry | B24B 31/116 |
| | | | | 451/36 |
| 4,005,549 | A * | 2/1977 | Perry | B24B 31/116 |
| | | | | 451/36 |
| 4,762,464 | A | 8/1988 | Vertz et al. | |
| 4,944,640 | A | 7/1990 | Suzuki et al. | |
| 5,039,562 | A | 8/1991 | Liang | |
| 5,070,652 | A * | 12/1991 | Rhoades | B24B 31/116 |
| | | | | 451/36 |
| 5,076,027 | A * | 12/1991 | Rhoades | B24B 31/116 |
| | | | | 451/64 |
| 5,223,320 | A | 6/1993 | Richardson | |
| 5,320,721 | A * | 6/1994 | Peters | B28B 3/269 |
| | | | | 205/685 |
| 5,342,166 | A * | 8/1994 | Hattori | F01D 5/186 |
| | | | | 415/115 |
| 5,367,833 | A * | 11/1994 | Rhoades | B24B 31/116 |
| | | | | 451/36 |
| 5,501,892 | A * | 3/1996 | Ohtsubo | B24B 9/06 |
| | | | | 428/34.4 |
| 5,746,691 | A * | 5/1998 | Frantzen | B24B 31/116 |
| | | | | 451/36 |
| 5,788,558 | A * | 8/1998 | Klein | B24B 31/116 |
| | | | | 451/36 |
| 5,807,163 | A * | 9/1998 | Perry | F02M 61/1806 |
| | | | | 451/36 |
| 6,158,929 | A | 12/2000 | Fisher | |
| 6,187,049 | B1 * | 2/2001 | Fujikawa | A61F 2/3609 |
| | | | | 623/22.4 |
| 6,283,833 | B1 * | 9/2001 | Pao | B24C 5/04 |
| | | | | 451/39 |
| 6,500,050 | B2 * | 12/2002 | Walch | B24B 31/116 |
| | | | | 451/36 |
| 6,529,449 | B1 | 3/2003 | Jordan et al. | |
| 6,640,597 | B2 | 11/2003 | Beeck et al. | |
| 6,685,176 | B2 * | 2/2004 | Wirth, Jr. | B25B 5/102 |
| | | | | 269/283 |
| 6,953,387 | B2 * | 10/2005 | Greenslet | B24B 31/116 |
| | | | | 451/36 |
| 7,427,227 | B2 * | 9/2008 | Ooka | B24B 1/00 |
| | | | | 451/36 |
| 2004/0229078 | A1 | 11/2004 | Maeda | |
| 2005/0227118 | A1 | 10/2005 | Uchimaru et al. | |
| 2006/0183625 | A1 | 8/2006 | Miyahara | |
| 2007/0111642 | A1 * | 5/2007 | Davis | B24C 3/325 |
| | | | | 451/99 |
| 2008/0099871 | A1 | 5/2008 | Bui et al. | |
| 2008/0264564 | A1 | 10/2008 | Sun et al. | |
| 2011/0198034 | A1 * | 8/2011 | Sun | H01J 37/3244 |
| | | | | 427/446 |
| 2011/0278069 | A1 * | 11/2011 | Ahonen | E21B 21/12 |
| | | | | 175/57 |
| 2013/0023401 | A1 | 1/2013 | Watanabe et al. | |
| 2013/0216783 | A1 | 8/2013 | Duan et al. | |
| 2013/0224498 | A1 * | 8/2013 | Sun | H01J 37/32467 |
| | | | | 428/432 |
| 2013/0273327 | A1 | 10/2013 | Sun et al. | |
| 2014/0363596 | A1 * | 12/2014 | Sun | C04B 41/87 |
| | | | | 252/387 |
| 2015/0097746 | A1 * | 4/2015 | Wilson | H01Q 13/00 |
| | | | | 451/36 |

FOREIGN PATENT DOCUMENTS

| | | | | |
|---|---|---|---|---|
| EP | 1245696 | A2 * | 10/2002 | B32B 18/00 |
| JP | 2007005666 | A | 1/2007 | |
| WO | 2014184067 | | 11/2014 | |
| WO | WO-2014184067 | A1 * | 11/2014 | B24B 31/006 |

* cited by examiner

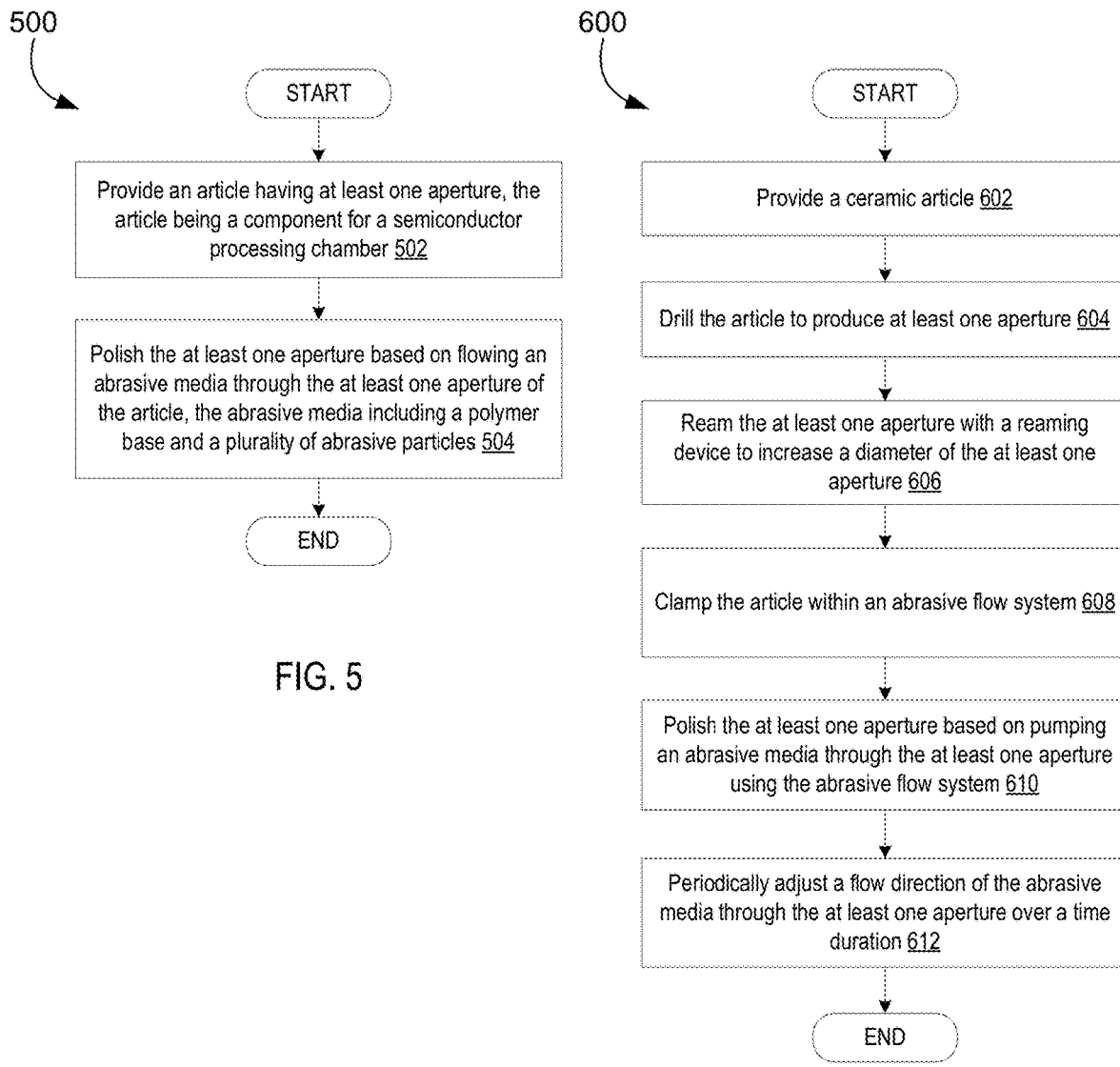

CHAMBER COMPONENTS WITH POLISHED INTERNAL APERTURES

CROSS-REFERENCE TO RELATED APPLICATION

This application is a divisional of U.S. application Ser. No. 17/834,207, filed Jun. 7, 2022, which is a divisional of U.S. application Ser. No. 16/216,796, filed Dec. 11, 2018, now U.S. Pat. No. 11,370,078, issued Jun. 28, 2022, which is a continuation of U.S. patent application Ser. No. 15/619,024, filed Jun. 9, 2017, now U.S. Pat. No. 10,189,141, issued Jan. 29, 2019, which is a divisional of U.S. patent application Ser. No. 14/318,518, filed Jun. 27, 2014, now U.S. Pat. No. 9,687,953, issued Jun. 27, 2017, all of which are hereby incorporated by reference.

TECHNICAL FIELD

Embodiments of the present invention relate, in general, to polishing internal surfaces of apertures in semiconductor processing chamber components and to chamber components with polished internal apertures.

BACKGROUND

In the semiconductor industry, devices are fabricated by a number of manufacturing processes producing structures of ever-decreasing size. As the critical dimensions for semiconductor devices continue to shrink, there is an unyielding need to improve the cleanliness of the processing environment within a semiconductor process chamber. Such contamination may be caused, in part, by chamber components. For example, contamination may be caused by gas delivery components, such as a showerhead.

Many bulk ceramic components include small apertures that allow for process gas flow. These apertures are usually drilled after performing a sintering process, which often results in rough internal surface finishes. Such rough interior surfaces serve as sources of on-wafer defects, since they are directly in contact with the flow of the process gases. To improve upon on-wafer defect performance, particulates can be at least partially removed, for example, from the rough internal apertures by thermal oxidation processes and by radio frequency (RF) conditioning of the component after thermal oxidation. However, some components, such as showerheads, often involve more than 100 hours of RF conditioning prior to using in a semiconductor process chamber in order to satisfactorily reduce particles.

SUMMARY

Embodiments of the present disclosure relate to the polishing of interior surfaces of apertures in ceramic articles. In one embodiment, a method includes providing a ceramic article having at least one aperture, the ceramic article being a component for a semiconductor processing chamber. The method further includes polishing the at least one aperture based on flowing an abrasive media through the at least one aperture of the article. The abrasive media includes a polymer base and a plurality of abrasive particles.

In another embodiment, a system includes a mounting stage, a clamp, and a pump fluidly coupled to the mounting stage by a ceramic article disposed between the clamp and mounting stage. An abrasive media flow path from the mounting stage to the clamp is defined by an aperture of a ceramic article.

In another embodiment, a chamber component includes a ceramic body and a plurality of apertures in the ceramic body. A roughness of the plurality of apertures is less than 32 µin.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIG. 5 is a flow diagram illustrating a process for polishing interior surfaces of apertures in a ceramic article according to an embodiment and FIG. 6 is a flow diagram illustrating a process 500 for polishing interior surfaces of apertures in a ceramic article according to an embodiment according to another embodiment.

DETAILED DESCRIPTION OF EMBODIMENTS

Embodiments of the present invention provide a ceramic article, such as a chamber component for a processing chamber. The ceramic article may have a composition of one or more of $Al_2O_3$, AlN, $SiO_2$, $Y_3Al_5O_{12}$ (YAG), $Y_4Al_2O_9$ (YAM), $Y_2O_3$, $Er_2O_3$, $Gd_2O_3$, $Gd_3Al_5O_{12}$ (GAG), $YF_3$, $Nd_2O_3$, $Er_4Al_2O_9$, $Er_3Al_5O_{12}$ (EAG), $ErAlO_3$, $Gd_4Al_2O_9$, $GdAlO_3$, $Nd_3Al_5O_{12}$, $Nd_4Al_2O_9$, $NdAlO_3$, or a ceramic compound composed of $Y_4Al_2O_9$ and a solid-solution of $Y_2O_3$—$ZrO_2$. The ceramic article includes one or more apertures passing through the ceramic article (e.g., to allow for gas flow through the ceramic article and into a processing chamber). The apertures may have been formed by drilling (e.g., acoustic drilling, laser drilling, mechanical drilling, etc.) into the ceramic article. The apertures may additionally be reamed following the drilling to increase a diameter of the drilled aperture.

To increase the smoothness of the interior surfaces of the apertures, an abrasive media is introduced into the apertures using an abrasive flow system. Abrasive flow machining is a surface finishing process that involves the flowing of a highly viscous abrasive media through apertures, slots, or other areas which may be difficult to reach by conventional polishing technologies. The abrasive media includes a highly viscous polymer base and abrasive particles such as silicon carbide, diamond, and/or boron nitride particles. The polishing effect can be varied by adjusting the viscosity of the media (e.g., changing the type of the polymer component or the amount of the abrasive loading into the polymer), a grit and/or type of the abrasive particles, and/or a pressure used to flow the media inside the apertures.

The disclosed systems and methods provide improved (e.g., smoother) surface finish within small apertures of semiconductor chamber ceramic articles over traditional articles. The improved surface finish of the apertures advantageously facilitates processing of semiconductor wafers by reducing particulates that result from use of the ceramic article within the semiconductor processing chamber. The systems and methods described herein further advantageously reduce process operations (e.g., oxidation and/or radio frequency conditioning) and/or processing times for the fabrication of chamber components used in process gas distribution. Radio frequency (RF) conditioning is the process of performing one or more operations to season or condition a chamber component. Moreover, some embodiments of the disclosed methods utilize drilling followed by reaming to produce apertures. When drilling and reaming is performed in conjunction with abrasive flow polishing, defects produced in the drilling/reaming process can be mitigated. Mitigation of the defects allows for robust and novel ways of fabricating apertures in ceramic articles.

Figure 1:
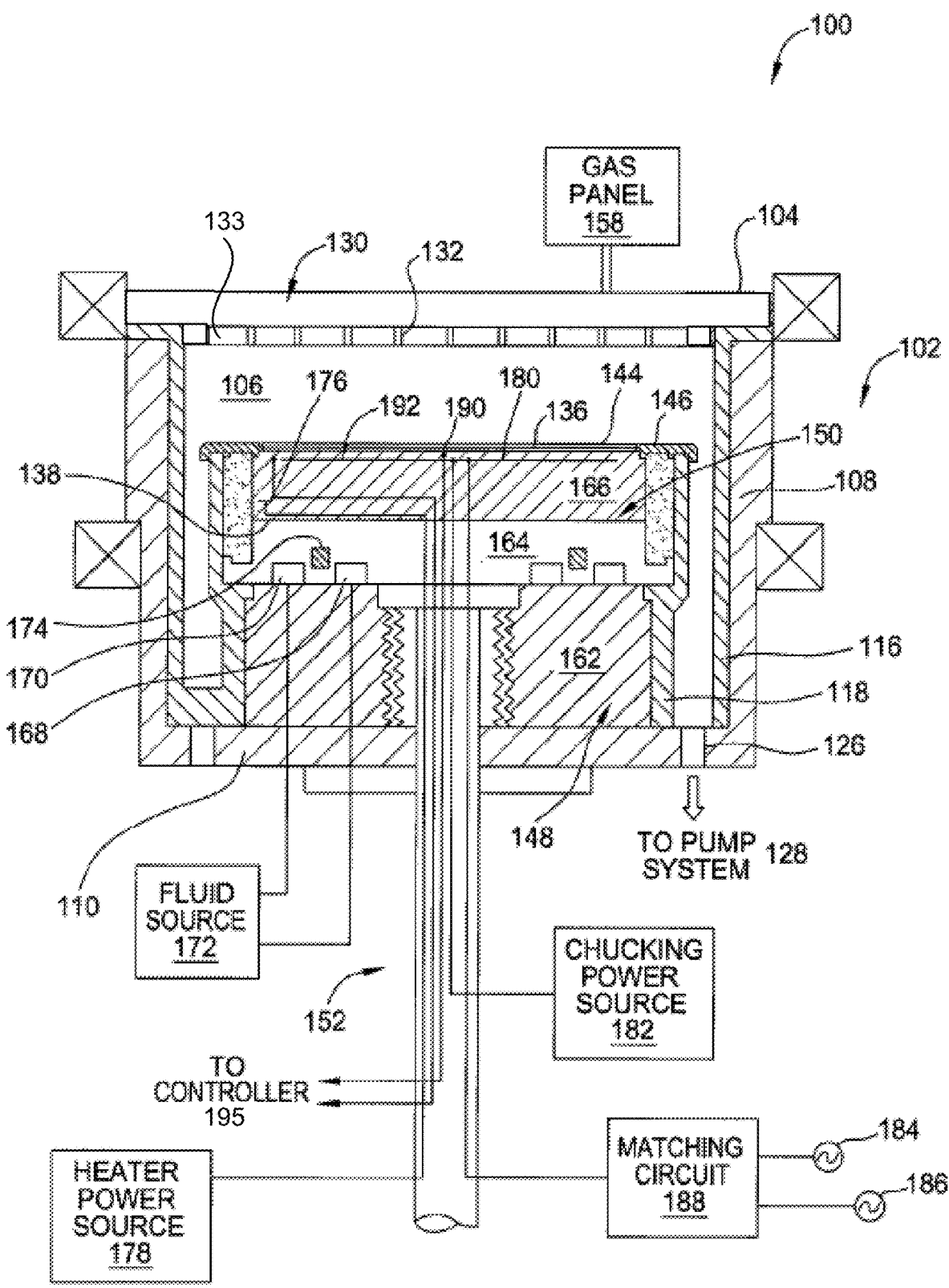
FIG. 1 depicts a sectional view of a processing chamber according to an embodiment.

FIG. 1 is a sectional view of a semiconductor processing chamber 100. The processing chamber 100 may be used for processes in which a corrosive plasma environment is provided. For example, the processing chamber 100 may be a chamber for a plasma etcher or plasma etch reactor, a plasma cleaner, and so forth. Examples of chamber components that may include one or more apertures include, but are not limited to, a substrate support assembly 148, an electrostatic chuck (ESC) 150, a gas distribution plate, a nozzle, a showerhead, a flow equalizer, a cooling base, a gas feeder, and a chamber lid 104. The apertures, which are described in greater detail below, may be apertures formed by drilling and/or reaming the chamber component during fabrication. The chamber component may be a ceramic article having a compositing of at least one of $Al_2O_3$, AlN, $SiO_2$, $Y_3Al_5O_{12}$, $Y_4Al_2O_9$, $Y_2O_3$, $Er_2O_3$, $Gd_2O_3$, $Gd_3Al_5O_{12}$, $YF_3$, $Nd_2O_3$, $Er_4Al_2O_9$, $Er_3Al_5O_{12}$, $ErAlO_3$, $Gd_4Al_2O_9$, $GdAlO_3$, $Nd_3Al_5O_{12}$, $Nd_4Al_2O_9$, $NdAlO_3$, or a ceramic compound composed of $Y_4Al_2O_9$ and a solid-solution of $Y_2O_3$—$ZrO_2$.

In one embodiment, the processing chamber 100 includes a chamber body 102 and a showerhead 130 that enclose an interior volume 106. Alternatively, the showerhead 130 may be replaced by a lid and a nozzle in some embodiments. The chamber body 102 may be fabricated from aluminum, stainless steel or other suitable material. The chamber body 102 generally includes sidewalls 108 and a bottom 110. One or more of the showerhead 130 (or lid and/or nozzle), sidewalls 108 and/or bottom 110 may include a one or more apertures.

An outer liner 116 may be disposed adjacent the sidewalls 108 to protect the chamber body 102. The outer liner 116 may be fabricated to include one or more apertures. In one embodiment, the outer liner 116 is fabricated from aluminum oxide.

An exhaust port 126 may be defined in the chamber body 102, and may couple the interior volume 106 to a pump system 128. The pump system 128 may include one or more pumps and throttle valves utilized to evacuate and regulate the pressure of the interior volume 106 of the processing chamber 100.

The showerhead 130 may be supported on the sidewall 108 of the chamber body 102. The showerhead 130 (or lid) may be opened to allow access to the interior volume 106 of the processing chamber 100, and may provide a seal for the processing chamber 100 while closed. A gas panel 158 may be coupled to the processing chamber 100 to provide process and/or cleaning gases to the interior volume 106 through the showerhead 130 or lid and nozzle (e.g., through apertures of the showerhead or lid and nozzle). Showerhead 130 may be used for processing chambers used for dielectric etch (etching of dielectric materials). The showerhead 130 includes a gas distribution plate (GDP) 133 having multiple gas delivery apertures 132 throughout the GDP 133. The showerhead 130 may include the GDP 133 bonded to an aluminum base or an anodized aluminum base. The GDP 133 may be made from Si or SiC, or may be a ceramic such as $Y_2O_3$, $Al_2O_3$, YAG, and so forth.

For processing chambers used for conductor etch (etching of conductive materials), a lid may be used rather than a showerhead. The lid may include a center nozzle that fits into a center hole of the lid. The lid may be a ceramic such as $Al_2O_3$, $Y_2O_3$, YAG, or a ceramic compound composed of $Y_4Al_2O_9$ and a solid-solution of $Y_2O_3$—$ZrO_2$. The nozzle may also be a ceramic, such as $Y_2O_3$, YAG, or the ceramic compound composed of $Y_4Al_2O_9$ and a solid-solution of $Y_2O_3$—$ZrO_2$. The lid, base of showerhead 130, GDP 133 and/or nozzle may be coated with a ceramic layer, which may be composed of one or more of any of the ceramic compositions described herein. The ceramic layer may be a plasma sprayed layer, a physical vapor deposition (PVD) deposited layer, an ion assisted deposition (IAD) deposited layer, or other type of layer. In one embodiment, the ceramic layer may have been coated onto the chamber component prior to formation of apertures.

Examples of processing gases that may be used to process substrates in the processing chamber 100 include halogen-containing gases, such as $C_2F_6$, $SF_6$, $SiCl_4$, HBr, $NF_3$, $CF_4$, $CHF_3$, $CH_2F_3$, F, $NF_3$, $Cl_2$, $CCl_4$, $BCl_3$ and $SiF_4$, among others, and other gases such as $O_2$, or $N_2O$. Examples of carrier gases include $N_2$, He, Ar, and other gases inert to process gases (e.g., non-reactive gases). The substrate support assembly 148 is disposed in the interior volume 106 of the processing chamber 100 below the showerhead 130 or lid. The substrate support assembly 148 holds the substrate 144 during processing. A ring 146 (e.g., a single ring) may cover a portion of the electrostatic chuck 150, and may protect the covered portion from exposure to plasma during processing. The ring 146 may be silicon or quartz in one embodiment.

An inner liner 118 may be coated on the periphery of the substrate support assembly 148. The inner liner 118 may be a halogen-containing gas resistant material such as those discussed with reference to the outer liner 116. In one embodiment, the inner liner 118 may be fabricated from the same materials of the outer liner 116. Additionally, the inner liner 118 may be coated with a ceramic layer and/or have one or more apertures passing through.

In one embodiment, the substrate support assembly 148 includes a mounting plate 162 supporting a pedestal 152, and an electrostatic chuck 150. The electrostatic chuck 150 further includes a thermally conductive base 164 and an electrostatic puck 166 bonded to the thermally conductive base by a bond 138, which may be a silicone bond in one embodiment. An upper surface of the electrostatic puck 166 is covered by the ceramic layer 136 in the illustrated embodiment. In one embodiment, the ceramic layer 136 is disposed on the upper surface of the electrostatic puck 166. In another embodiment, the ceramic layer 136 is disposed on the entire exposed surface of the electrostatic chuck 150 including the outer and side periphery of the thermally conductive base 164 and the electrostatic puck 166. The mounting plate 162 is coupled to the bottom 110 of the chamber body 102 and includes passages for routing utilities (e.g., fluids, power lines, sensor leads, etc.) to the thermally conductive base 164 and the electrostatic puck 166.

The thermally conductive base 164 and/or electrostatic puck 166 may include one or more optional embedded heating elements 176, embedded thermal isolators 174 and/or conduits 168, 170 to control a lateral temperature profile of the substrate support assembly 148. The conduits 168, 170 may be fluidly coupled to a fluid source 172 that circulates a temperature regulating fluid through the conduits 168, 170. The embedded thermal isolator 174 may be disposed between the conduits 168, 170 in one embodiment. The heating element 176 is regulated by a heater power source 178. The conduits 168, 170 and heating element 176 may be utilized to control the temperature of the thermally conductive base 164, which may be used for heating and/or cooling the electrostatic puck 166 and a substrate 144 (e.g., a wafer) being processed. The temperature of the electrostatic puck 166 and the thermally conductive base 164 may be monitored using a plurality of temperature sensors 190, 192, which may be monitored using a controller 195.

The electrostatic puck 166 may further include multiple gas passages or apertures such as grooves, mesas and other surface features, which may be formed in an upper surface of the electrostatic puck 166 and/or the ceramic layer 136. The gas passages may be polished in accordance with embodiments described herein. The gas passages may be fluidly coupled to a source of a heat transfer (or backside) gas such as helium via apertures drilled in the electrostatic puck 166. In operation, the backside gas may be provided at controlled pressure into the gas passages to enhance the heat transfer between the electrostatic puck 166 and the substrate 144. The electrostatic puck 166 includes at least one clamping electrode 180 controlled by a chucking power source 182. The clamping electrode 180 (or other electrode disposed in the electrostatic puck 166 or conductive base 164) may further be coupled to one or more RF power sources 184, 186 through a matching circuit 188 for maintaining a plasma formed from process and/or other gases within the processing chamber 100. The power sources 184, 186 are generally capable of producing an RF signal having a frequency from about 50 kHz to about 3 GHz, with a power output of up to about 10,000 Watts.

Figure 2:
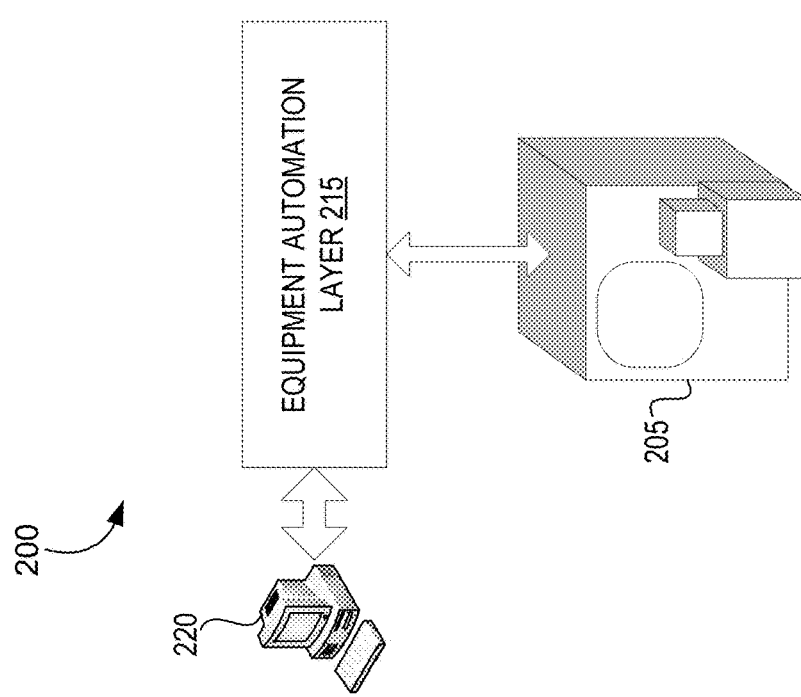
FIG. 2 depicts an exemplary architecture of a manufacturing system according to an embodiment.

FIG. 2 illustrates an exemplary architecture of a manufacturing system 200 according to one embodiment. The manufacturing system 200 may be a ceramics manufacturing system, which may include the processing chamber 100. In some embodiments, the manufacturing system 200 may be a processing chamber for manufacturing, cleaning, or modifying a chamber component of the processing chamber 100. In one embodiment, the manufacturing system 200 includes an abrasive flow system 205, an equipment automation layer 215, and a computing device 220. In alternative embodiments, the manufacturing system 200 may include more or fewer components. For example, the manufacturing system 200 may include only the abrasive flow system 205, which may be a manual off-line machine.

The abrasive flow system 205 may be a machine designed to direct a flow of an abrasive media through one or more apertures of an article (e.g., a ceramic article for use in a semiconductor processing chamber). The abrasive flow system 205 may include a mounting stage and a clamp used to hold the article in place during processing, so as to produce a fixture with a sealed flow path for flowing the abrasive media through the article. The abrasive flow system 205 may include an external pump for pumping the abrasive media through the fixture. The clamp may be a pneumatic or hydraulic clamp, and the abrasive flow system 205 may additionally include other pumps that are used to generate a clamping force.

The abrasive flow system 205 may be an off-line machine that can be programmed with a process recipe. The process recipe may control the applied clamping force, flow rates, flow directions, process times, or any other suitable parameter. Alternatively, abrasive flow system 205 may be an on-line automated machine that can receive process recipes from computing devices 220 (e.g., personal computers, server machines, etc.) via an equipment automation layer 215. The equipment automation layer 215 may interconnect the abrasive flow system 205 with computing devices 220, with other manufacturing machines, with metrology tools, and/or other devices.

The equipment automation layer 215 may include a network (e.g., a location area network (LAN)), routers, gateways, servers, data stores, and so on. The abrasive flow system 205 may connect to the equipment automation layer 215 via a SEMI Equipment Communications Standard/Generic Equipment Model (SECS/GEM) interface, via an Ethernet interface, and/or via other interfaces. In one embodiment, the equipment automation layer 215 enables process data (e.g., data collected by the abrasive flow system 205 during a process run) to be stored in a data store (not shown). In an alternative embodiment, the computing device 220 connects directly to the abrasive flow system 205.

In one embodiment, the abrasive flow system 205 includes a programmable controller that can load, store and execute process protocols. The programmable controller may pressure settings, fluid flow settings, time settings, etc. for a process performed by abrasive flow system 205. The programmable controller may include a main memory (e.g., read-only memory (ROM), flash memory, dynamic random access memory (DRAM), static random access memory (SRAM), etc.), and/or a secondary memory (e.g., a data storage device such as a disk drive). The main memory and/or secondary memory may store instructions for performing abrasive flow polishing, as described herein.

The programmable controller may also include a processing device coupled to the main memory and/or secondary memory (e.g., via a bus) to execute the instructions. The processing device may be a general-purpose processing device such as a microprocessor, central processing unit, or the like. The processing device may also be a special-purpose processing device, such as an application specific integrated circuit (ASIC), a field programmable gate array (FPGA), a digital signal processor (DSP), a network processor, or the like. In one embodiment, programmable controller is a programmable logic controller (PLC).

Figure 3:
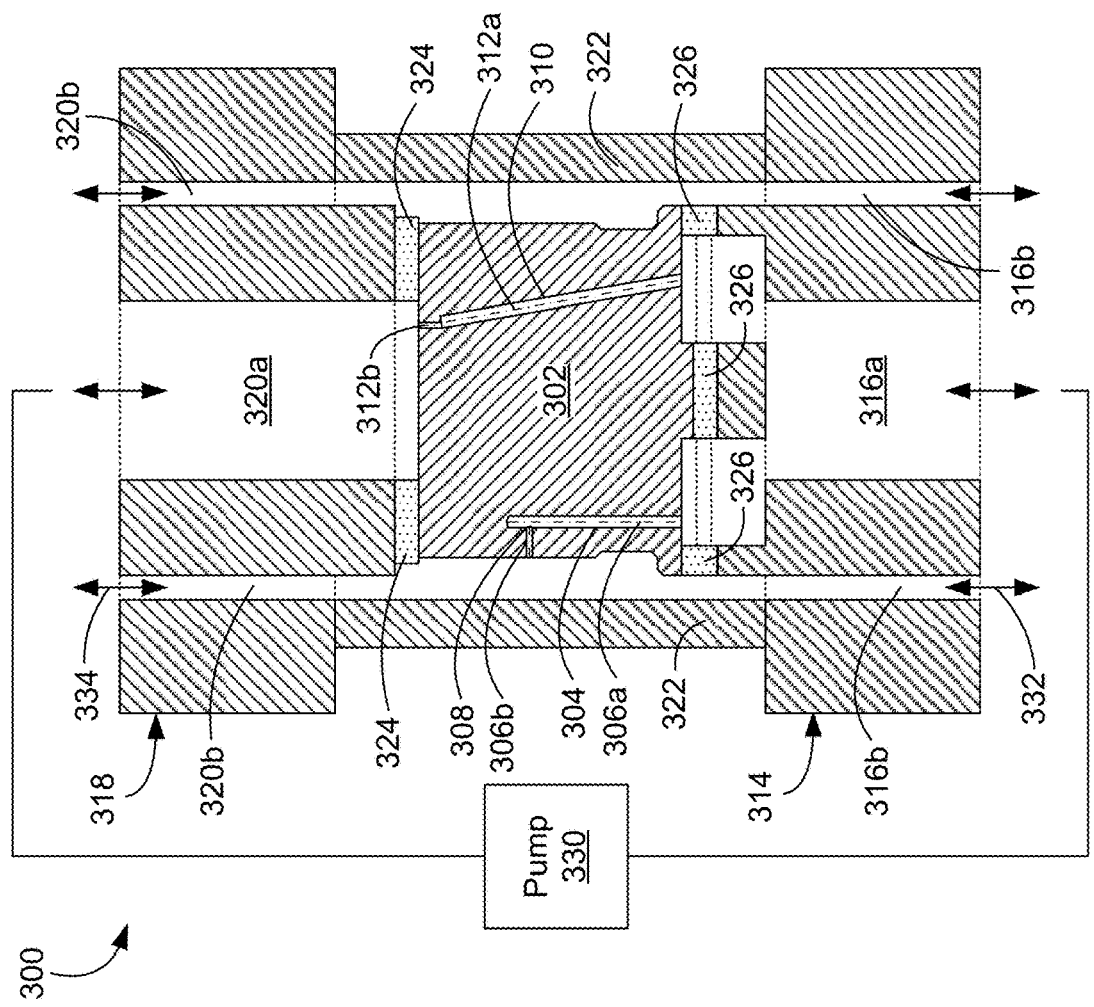
FIG. 3 depicts a sectional view of an abrasive flow system according to an embodiment.

FIG. 3 depicts a sectional view of an abrasive flow system 300 according to an embodiment. For example, the abrasive flow system 300 may be the same or similar to manufacturing system 200 described with respect to FIG. 2. The abrasive flow system 300 may be configured to perform abrasive flow polishing on an article 302 (e.g., a ceramic chamber component). A fixture may be formed by clamping the article 302 between a clamp 318 and a mounting stage 314. A ring 322 may be placed around the article 302, which contacts the mounting stage 314 and the clamp 318. Each of the mounting stage 314, the clamp 318, and the ring 322 may be a metallic material (e.g., stainless steel) or a ceramic material (e.g., any of the ceramic compositions described herein). In some embodiments, o-rings are placed between the mounting stage 314 and the ring 322 and/or the clamp 318 and the ring 322. In some embodiments, the claim 318 may be a hydraulic clamp or a pneumatic clamp. The clamp 318 may be capable of applying a clamping pressure between about 1500 pounds per square-inch (psi) and about 2500 psi to the article 302.

The article 302 may be any suitable chamber component described with respect to FIG. 1, including a substrate support assembly, an electrostatic chuck (ESC), a chamber wall, a base, a gas distribution plate or showerhead, a liner, a liner kit, a shield, a plasma screen, a flow equalizer, a cooling base, a chamber lid, etc. The article 302 may be a ceramic material, metal-ceramic composite, or a polymer-ceramic composite. As illustrated in FIG. 3, the article 302 includes apertures 304 and 310, which pass through the article 302. The apertures 304 and 310 may have any suitable shape, such as circular, c-slot, etc. Other shapes of the apertures 304 and 310 may also be provided. The article 302 may have any suitable dimensions for incorporation into a semiconductor chamber. For example, in some embodiments, the article 302 may be a showerhead having a thickness between about 50 mm to about 200 mm. The article 302 may also have a diameter of between about 200 to about 500 mm.

As depicted in FIG. 3, in one embodiment the aperture 304 includes a first region 306a having a first diameter (e.g., about 0.1 inches) and a second region 306b having a second diameter (e.g., about 0.05 inches). The aperture 304 is formed by the first region 306a and second region 306b joined by a junction 308 between the first region 306a and second region 306b. For example, the first region 306 may have been formed by drilling a hole into the article 302 using a first drill, and the second region 306b may have been formed by drilling a hole into the article 302 using a second drill with a smaller diameter bit than the first drill. Aperture 310 may have been formed in a similar manner as aperture 304. For example, aperture 310 has a first region 312a having a first diameter and a second region 312b having a second diameter. In some embodiments, for any aperture, a diameter of the aperture may range from about 0.01 inches to about 0.1 inches. It is noted that apertures 304 and 310 are merely illustrative, and any suitable aperture (e.g., with or without bends and with or without multiple diameters) may be formed in article 302.

The mounting stage 314 may include multiple apertures passing through the mounting stage 314, such as central aperture 316a and side apertures 316b. Similarly, the clamp 318 may include multiple apertures passing through the clamp 318, such as central aperture 320a and side apertures 320b. The mounting stage 314, clamp 318, and their respective apertures 316a, 316b, 320a, and 320b may be sized and shaped to interface with the article 302 such that flow paths 332 and 334 are defined through the mounting stage 314, article 302, and clamp 318 for an abrasive media to pass through. In some embodiments, one or more of pads 324 and 326 may be placed, respectively, between the clamp 318 and the article 302 and between the mounting stage 314 and the article 302. Each of pads 324 and 326 may be multilayered and/or have multiple pads. In some embodiments, the pads 324 and 326 are rubber pads (e.g., urethane, polyoxymethylene, etc.). The pads 324 and 326 may be fabricated to be of suitable shapes to allow for variance in the height/dimensions of the article 302. In some embodiments, if less than all of the apertures of the article are to be polished with the abrasive media, one or more of the mounting stage 314, the pads 324 and 326, the clamp 318, and the ring 322 may be fabricated/machined such that the flow path passes through the apertures that are to be polished while blocking the flowpath through the one or more apertures that are not to be polished.

A pump 330 may be coupled to the mounting stage 314 and the clamp 318. The pump 330 may provide the pressure used to flow the abrasive media through the apertures 304 and 310 of the article 302. For example, the pump 330 may be an axial piston pump, a radial piston pump, a hydraulic pump, etc. In one embodiment, the pressure applied by the pump 330 is between about 500 psi and about 1500 psi. The pump 330 may be configured to repeatedly flow the abrasive media back and forth through the apertures 304 and 310 for a duration of time suitable for producing a smooth finish within the aperture interiors. Accordingly, the pump 330 may flow the abrasive media through the apertures 304, 310 in a first direction, and then reverse the flow of the abrasive media and flow it back through the apertures 304, 310 in the opposite direction. In one embodiment, the pump may include a piston disposed on either side of the fixture (e.g., on either side of the mounting stage 314 and the clamp 318). The abrasive media may be forced through the apertures 316a, 316b, 304, 310, 320a, and 320b by alternating the stroke of each piston. The force supplied by each piston, the frequency of the piston motion, and the total processing time may be adjusted to polish the interior surfaces of the apertures 304 and 310. In some embodiments, the processing time duration is between about 5 minutes and about 30 minutes.

The processing time duration may be pre-determined based on previously generated surface morphology micrographs used as guidelines for determining a target finish. In one embodiment, the target finish time is based on a measured surface roughness. For example, a protocol (e.g., including parameters such as abrasive grit, abrasive particle concentration, number of cycles, pressures, etc.) may be defined by determining a combination of parameters that yield a particular range of surface roughnesses. In one embodiment, the processing time duration may be selected such that a target volume of abrasive media is flowed through the apertures. Given a flow rate Q (which can be controlled by the pump 330) and a target volume V, the total processing time t is defined as V/Q. In some implementations, a flow rate is between about 10 $in^3$/min and about 30 $in^3$/min, and a total processing time is between about 10 minutes and about 30 minutes.

In some embodiments, the abrasive media may be a slurry. For example, the slurry may include abrasive particles dispersed in a liquid, such as a high viscosity liquid having a polymer base. The particles may be delivered to the interior of apertures of a ceramic article in a solution containing water, an oil-based plasticizer, and/or any other liquid capable of suspending the particles. In some embodiments, the particles may make up between about 10 to about 80 percent by weight of the slurry. The viscosity of the slurry may be adjusted by adjusting either particle concentration, solution composition, or a combination thereof. Increased viscosity may result in greater smoothness of the interior surfaces of the apertures and improved removal of the damaged surfaces. In some embodiments, the viscosity of the slurry may be between about 150,000 centiPoise (cP) to about 750,000 cP. In some embodiments, the particles may comprise at least one of diamond, silicon carbide (SiC), or boron carbide (BC). In some embodiments, a mass-median-diameter (D50) of the particles in the slurry, which is the average particle diameter by mass, may be between about 1 micrometer and about 100 micrometers. In some embodiments, a D50 of the particles may be between about 20 micrometers and about 30 micrometers. Smaller grit sizes may cause the polished surface of the apertures to be smoother. However, in some instances it takes longer to polish the apertures with smaller grit sizes. In some instances, a first abrasive media with a first grit size is used initially followed by a second abrasive media having a second smaller grit size.

Figure 4A:
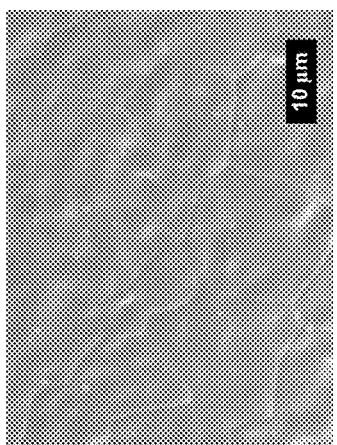
FIGS. 4a-4i are micrographs comparing unpolished apertures to apertures polished according to an embodiment.
Figure 4B:
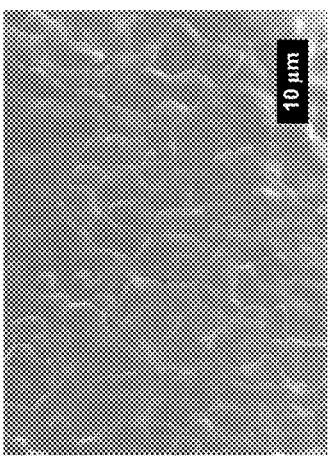
Figure 4C:
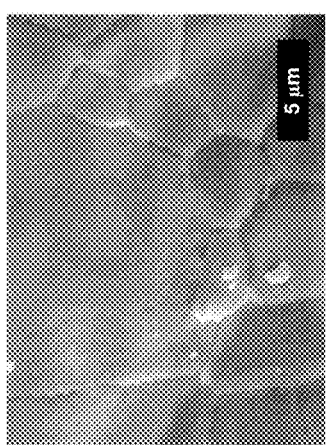
Figure 4D:
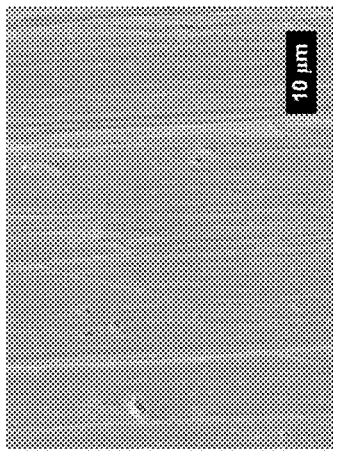
Figure 4E:
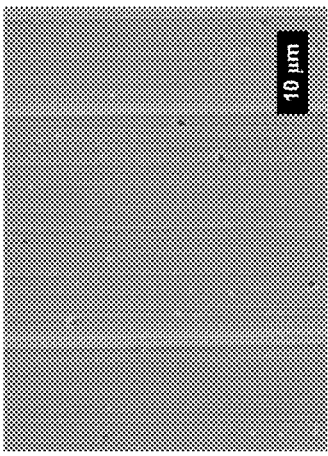
Figure 4F:
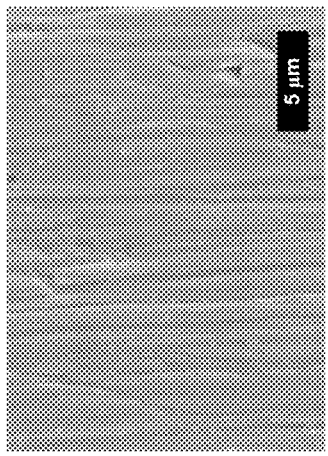
Figure 4G:
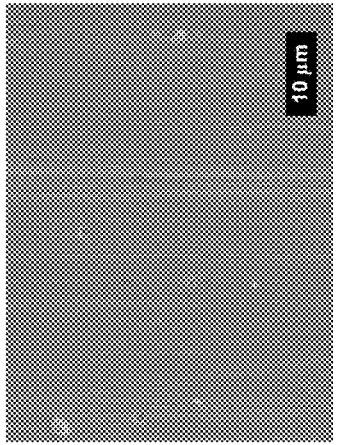
Figure 4H:
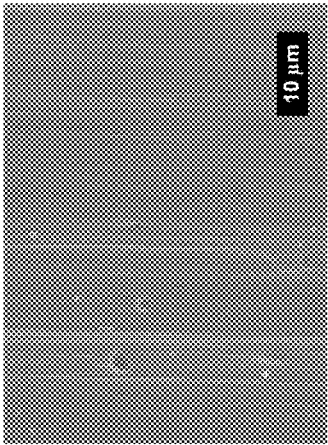
Figure 4I:
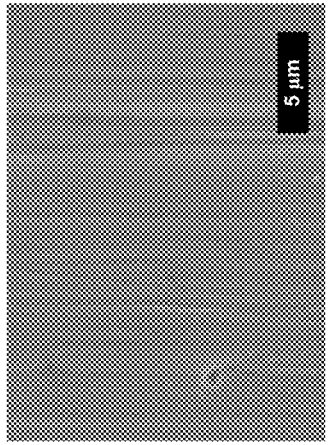

FIGS. 4a-4i are micrographs comparing unpolished apertures to apertures polished according to an embodiment. Each of FIGS. 4a-4i show the interior surfaces of a 0.05 inch diameter aperture within a chamber nozzle. FIGS. 4a-c show different views of the aperture of the nozzle prior to abrasive flow polishing, in which cracks and grain boundaries along the interior surface are clearly visible. FIGS. 4d-f show an interior surface of an aperture after abrasive flow polishing with 250 in$^3$ of abrasive media. FIGS. 4g-i show the interior surface of an aperture after abrasive flow polishing with 500 in$^3$ of abrasive media, showing an improvement over FIGS. 4d-f with increasing abrasive media treatment (a surface roughness less than 25 µin)

FIG. 5 is a flow diagram illustrating a process 500 for polishing interior surfaces of apertures in an article according to an embodiment. At block 502, an article is provided, the article having at least one aperture and being a component for a semiconductor processing chamber. In one embodiment, one or more apertures of the article vary in diameter. For example, a first portion of the aperture may have a first diameter and a second portion of the aperture may have a second diameter. The one or more apertures may also be non-linear (e.g., the aperture may change directions within the article). An aperture with multiple diameters and that changes directions poses challenges to conventional polishing techniques.

In one embodiment, the article is a semiconductor chamber component, such as a lid, a nozzle, an electrostatic chuck, a showerhead, a liner kit, or any other suitable chamber component having apertures. In one embodiment, the article is a metal article such as aluminum, an aluminum alloy, titanium, stainless steel, and so on. In one embodiment, the article is a polymer based material. In one embodiment, the article includes multiple different materials (e.g., a metal base and a ceramic layer over the metal base).

In one embodiment, the article is a ceramic article. In one embodiment, the article may be a ceramic article having a composition that includes one or more of $Al_2O_3$, AlN, $SiO_2$, $Y_3Al_5O_{12}$, $Y_4Al_2O_9$, $Y_2O_3$, $Er_2O_3$, $Gd_2O_3$, $Er_3Al_5O_{12}$, $Gd_3Al_5O_{12}$, $YF_3$, $Nd_2O_3$, $Er_4Al_2O_9$, $ErAlO_3$, $Gd_4Al_2O_9$, $GdAlO_3$, $Nd_3Al_5O_{12}$, $Nd_4Al_2O_9$, $NdAlO_3$, or a ceramic compound composed of $Y_4Al_2O_9$ and a solid-solution of $Y_2O_3$—$ZrO_2$. In some embodiments, the article may alternatively or additionally include $ZrO_2$, $Al_2O_3$, $SiO_2$, $B_2O_3$, $Nd_2O_3$, $Nb_2O_5$, $CeO_2$, $Sm_2O_3$, $Yb_2O_3$, or other oxides.

With reference to the ceramic compound composed of $Y_4Al_2O_9$ and a solid-solution of $Y_2O_3$—$ZrO_2$, in one embodiment, the ceramic compound includes 62.93 molar ratio (mol %) $Y_2O_3$, 23.23 mol % $ZrO_2$ and 13.94 mol % $Al_2O_3$. In another embodiment, the ceramic compound can include $Y_2O_3$ in a range of 50-75 mol %, $ZrO_2$ in a range of 10-30 mol % and $Al_2O_3$ in a range of 10-30 mol %. In another embodiment, the ceramic compound can include $Y_2O_3$ in a range of 40-100 mol %, $ZrO_2$ in a range of 0-60 mol % and $Al_2O_3$ in a range of 0-10 mol %. In another embodiment, the ceramic compound can include $Y_2O_3$ in a range of 40-60 mol %, $ZrO_2$ in a range of 30-50 mol % and $Al_2O_3$ in a range of 10-20 mol %. In another embodiment, the ceramic compound can include $Y_2O_3$ in a range of 40-50 mol %, $ZrO_2$ in a range of 20-40 mol % and $Al_2O_3$ in a range of 20-40 mol %. In another embodiment, the ceramic compound can include $Y_2O_3$ in a range of 70-90 mol %, $ZrO_2$ in a range of 0-20 mol % and $Al_2O_3$ in a range of 10-20 mol %. In another embodiment, the ceramic compound can include $Y_2O_3$ in a range of 60-80 mol %, $ZrO_2$ in a range of 0-10 mol % and $Al_2O_3$ in a range of 20-40 mol %. In another embodiment, the ceramic compound can include $Y_2O_3$ in a range of 40-60 mol %, $ZrO_2$ in a range of 0-20 mol % and $Al_2O_3$ in a range of 30-40 mol %. In another embodiment, the ceramic compound can include $Y_2O_3$ in a range of 30-60 mol %, $ZrO_2$ in a range of 0-20 mol % and $Al_2O_3$ in a range of 30-60 mol %. In another embodiment, the ceramic compound can include $Y_2O_3$ in a range of 20-40 mol %, $ZrO_2$ in a range of 20-80 mol % and $Al_2O_3$ in a range of 0-60 mol %. In other embodiments, other distributions may also be used for the ceramic compound.

In one embodiment, an alternative ceramic compound that includes a combination of $Y_2O_3$, $ZrO_2$, $Er_2O_3$, $Gd_2O_3$ and $SiO_2$ is used for the article. In one embodiment, the alternative ceramic compound can include $Y_2O_3$ in a range of 40-45 mol %, $ZrO_2$ in a range of 0-10 mol %, $Er_2O_3$ in a range of 35-40 mol %, $Gd_2O_3$ in a range of 5-10 mol % and SiO2 in a range of 5-15 mol %. In another embodiment, the alternative ceramic compound can include $Y_2O_3$ in a range of 30-60 mol %, $ZrO_2$ in a range of 0-20 mol %, $Er_2O_3$ in a range of 20-50 mol %, $Gd_2O_3$ in a range of 0-10 mol % and SiO2 in a range of 0-30 mol %. In a first example, the alternative ceramic compound includes 40 mol % $Y_2O_3$, 5 mol % $ZrO_2$, 35 mol % $Er_2O_3$, 5 mol % $Gd_2O_3$ and 15 mol % $SiO_2$. In a second example, the alternative ceramic compound includes 45 mol % $Y_2O_3$, 5 mol % $ZrO_2$, 35 mol % $Er_2O_3$, 10 mol % $Gd_2O_3$ and 5 mol % $SiO_2$. In a third example, the alternative ceramic compound includes 40 mol % $Y_2O_3$, 5 mol % $ZrO_2$, 40 mol % $Er_2O_3$, 7 mol % $Gd_2O_3$ and 8 mol % $SiO_2$. In one embodiment, the article includes 70-75 mol % $Y_2O_3$ and 25-30 mol % $ZrO_2$. In a further embodiment, the article is a material entitled YZ20 that includes 73.13 mol % $Y_2O_3$ and 26.87 mol % $ZrO_2$.

Referring back to FIG. 5, at block 504, the at least one aperture of the article is polished based on flowing an abrasive media through the at least one aperture of the article. The abrasive media includes a polymer base and multiple abrasive particles suspended in the polymer base. The abrasive media may polish the apertures even if the apertures vary in diameter and are non-linear. In one embodiment, the abrasive particles include at least one of silicon carbide, diamond, or boron nitride. An average size of the abrasive particles may range from 5 micrometers to 100 micrometers. In one embodiment, the article is polished using an abrasive flow system (e.g., abrasive flow system 300), which is described in more detail below with respect to FIG. 6.

FIG. 6 is a flow diagram illustrating a process 600 for polishing interior surfaces of apertures in a ceramic article according to another embodiment. At block 602, a ceramic article is provided. The ceramic article may by any suitable ceramic article described herein, such as a component of a semiconductor processing chamber. The ceramic article may include one or more of the ceramic materials described with respect to block 502 of FIG. 5.

At block 604, holes are drilled through the ceramic article to produce at least one aperture. In one embodiment, each aperture may be of a size range from about 0.01 inches to about 0.1 inches. In one embodiment, a first hole having a first diameter (e.g., between about 0.05 inches and 0.1 inches) is drilled into or through the ceramic article, and a second hole having a second diameter (e.g., between about 0.01 inches and about 0.05 inches) is drilled into the ceramic article (e.g., through the first hole, or into a different portion of the ceramic article). The first and second holes may intersect, forming an aperture through the ceramic article that has a first diameter at a first region (corresponding to the first hole) and a second diameter at a second region (corresponding to the second hole). In one embodiment, the first diameter is greater than the second diameter. In one embodiment, the first region is parallel with the second region (e.g., a linear aperture having two different diameters at different portions). In one embodiment, the aperture has a bend (e.g, the first region and second region intersect, but are not parallel).

In one embodiment, at block 606, the at least one aperture is reamed with a reaming device to increase a diameter of the at least one aperture. The diameter of the reaming device may be selected to be larger than a diameter of the at least one aperture (e.g., by about 0.5% to about 2% larger that the diameter of the at least one aperture). In one embodiment, the drill may have a first grit size, and the ream may have a second grit size, and the first grit size of the drill is courser than the second grit size of the ream. In one embodiment, the first grit size of the drill is between about 100 grit and about 150 grit. In one embodiment, the second grit size of the reaming device is between about 400 grit (e.g., about 40 micrometer particle size) and 800 grit (e.g., about 25 micrometer particle size).

At block 608, the ceramic article is clamped within an abrasive flow system (e.g., abrasive flow system 300 of FIG. 3). The abrasive flow system may include a mounting stage (e.g., mounting stage 314) and a clamp (e.g., clamp 318). The ceramic article may be placed between the clamp and the mounting stage such that a flow path for an abrasive media is defined by the at least one aperture, such that the abrasive media may flow from the mounting stage, through the at least one aperture, and through the clamp (as illustrated in FIG. 3). In some embodiments, the clamp may be a hydraulic clamp or a pneumatic clamp. In some embodiments, the clamp may apply a clamping pressure to the ceramic article that is between about 1,500 psi and 2,500 psi. In some embodiments, one or more pads (e.g., pads 326 and 324) are disposed between the ceramic article and the clamp, and/or the ceramic article and the mounting stage.

At block 610, the at least one aperture is polished by pumping the abrasive media through the at least one aperture using the abrasive flow system. A pump (e.g., pump 330) may be fluidly coupled to the abrasive flow system such that the abrasive media flows through the at least one aperture of the ceramic article. In one embodiment, the pump provides a pressure of about 500 psi to about 1000 psi to the abrasive media. In one embodiment, the abrasive media includes many abrasive particles (e.g., thousands or tens of thousands of abrasive particles). The abrasive particles may include at least one or silicon carbide, diamond, or boron nitride particles. In one embodiment, the average size of each of the plurality of abrasive particles ranges from 5 to 100 micrometers.

At block 612, a flow direction of the abrasive media through the at least one aperture is periodically adjusted over a time duration. In one embodiment, the time duration is between about 20 minutes and about 60 minutes. In one embodiment, the flow direction may be changed (e.g., from a forward direction to a reverse direction) one or more times during the time duration. For example, the flow direction may be changed every 5-10 minutes. In one embodiment, the abrasive media includes an oil-based plasticizer. In one embodiment, a viscosity of the abrasive media is between about 150,000 cP and about 750,000 cP.

After flowing the abrasive media through the at least one aperture, the at least one aperture may have a surface roughness (average surface roughness, Ra) of less than 32 µin. In one embodiment, an opening of the at least one aperture (at an outer surface of the ceramic article) has a rounded edge after the polishing.

In one embodiment, a ceramic plasma resistant layer is formed on the article after the apertures are polished. The ceramic plasma resistant layer may be composed of any of the aforementioned ceramics, and may be deposited onto the article by plasma spraying, physical vapor deposition, ion assisted deposition, or other deposition techniques. In an alternative embodiment, the ceramic plasma resistant layer may be formed on a surface of the article before the holes are drilled and the polishing is performed.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular embodiments may vary from these exemplary details and still be contemplated to be within the scope of the present disclosure.

Reference throughout this specification to "one embodiment" or "an embodiment" indicates that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within ±10%.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of embodiments of the invention should, therefore, be determined with reference to the appended claims, along with the full scope of equivalents to which such claims are entitled.

What is claimed is:

1. A plasma-resistant chamber component of a semiconductor processing chamber that generates a plasma environment, the chamber component comprising:
a ceramic article having a plurality of polished apertures therein, wherein a roughness of the plurality of polished apertures is less than 32 µin, wherein at least one aperture of the plurality of polished apertures was polished by flowing an abrasive media through the at least one aperture, wherein the abrasive media comprises a polymer base and a plurality of abrasive particles, and wherein a viscosity of the abrasive media is between about 150,000 cP and about 750,000 cP.

2. The chamber component of claim 1, wherein at least one of the plurality of polished apertures have a first diameter at a first region and a second diameter at a second region, wherein the second diameter is less than the first diameter.

3. The chamber component of claim 1, wherein at least one of the plurality of polished apertures comprises at least one bend within the chamber component.

4. The chamber component of claim 1, wherein at least one of the plurality of polished apertures is substantially non-linear.

5. The chamber component of claim 1, wherein an opening of at least one of the plurality of polished apertures has a rounded edge.

6. The chamber component of claim 1, wherein the ceramic article comprises at least one of $Al_2O_3$, AlN, $SiO_2$, $Y_3Al_5O_{12}$, $Y_4Al_2O_9$, $Y_2O_3$, $Er_2O_3$, $Gd_2O_3$, $Er_3Al_5O_{12}$, $Gd_3Al_5O_{12}$, $YF_3$, $Nd_2O_3$, $Er_4Al_2O_9$, $ErAlO_3$, $Gd_4Al_2O_9$, $GdAlO_3$, $Nd_3Al_5O_{12}$, $Nd_4Al_2O_9$, $NdAlO_3$, or a ceramic compound comprising $Y_4Al_2O_9$ and a solid-solution of $Y_2O_3$—$ZrO_2$.

7. The chamber component of claim 1, wherein the chamber component is a showerhead gas distribution plate or a nozzle.

8. The chamber component of claim 1, wherein the chamber component is selected from a group consisting of a substrate support assembly, an electrostatic chuck, a gas distribution plate, a nozzle, a showerhead, a flow equalizer, a cooling base, a gas feeder, a liner kit, and a chamber lid.

9. The chamber component of claim 1, wherein a diameter of at least one of the plurality of polished apertures is between about 0.01 inches and about 0.1 inches.

10. The chamber component of claim 9, wherein the diameter of the at least one of the plurality of polished apertures is between about 0.05 inches and about 0.1 inches.

11. The chamber component of claim 9, wherein the diameter of the at least one of the plurality of polished apertures is between about 0.01 inches and about 0.05 inches.

12. The chamber component of claim 1, wherein the roughness of the plurality of polished apertures is less than 25 µin.

13. The chamber component of claim 1, wherein at least one of the polished apertures pass through a body of the ceramic article.

14. The chamber component of claim 1, wherein the ceramic article is coated with a ceramic layer.

15. The chamber component of claim 1, wherein the ceramic article comprises a material selected from a group consisting of a ceramic material, a metal-ceramic composite material, and a polymer-ceramic composite material.

16. The chamber component of claim 1, wherein at least one of the plurality of polished apertures comprises a circular shape or a c-slot shape.

17. The chamber component of claim 1, wherein the ceramic article has a diameter between about 200 millimeters and about 500 millimeters.

18. The chamber component of claim 1, wherein the ceramic article has a thickness between about 50 millimeters and about 200 millimeters.

19. The chamber component of claim 1, wherein the ceramic article comprises one or more junctions joining two or more apertures of the plurality of polished apertures.

20. The chamber component of claim 1, wherein the ceramic article further comprises one or more non-polished apertures.

\* \* \* \* \*